(12) United States Patent
Lee et al.

(10) Patent No.: US 8,891,226 B2
(45) Date of Patent: Nov. 18, 2014

(54) MULTILAYER CERAMIC ELECTRONIC COMPONENT AND METHOD OF MANUFACTURING THE SAME

(71) Applicant: Samsung Electro-Mechanics Co., Ltd., Gyunggi-do (KR)

(72) Inventors: Chung Eun Lee, Gyunggi-do (KR); Jae Yeol Choi, Gyunggi-do (KR); Doo Young Kim, Gyunggi-do (KR); Wi Heon Kim, Gyunggi-do (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 140 days.

(21) Appl. No.: 13/732,031

(22) Filed: Dec. 31, 2012

(65) Prior Publication Data
US 2013/0229749 A1   Sep. 5, 2013

(30) Foreign Application Priority Data
Mar. 5, 2012   (KR) .......................... 10-2012-0022376

(51) Int. Cl.
| | |
|---|---|
| H01G 4/06 | (2006.01) |
| H01G 4/12 | (2006.01) |
| H01G 4/005 | (2006.01) |
| H01G 4/30 | (2006.01) |
| H01G 4/228 | (2006.01) |
| H01G 4/012 | (2006.01) |
| H01G 4/232 | (2006.01) |

(52) U.S. Cl.
CPC .................. *H01G 4/12* (2013.01); *H01G 4/005* (2013.01); *H01G 4/30* (2013.01); *H01G 4/228* (2013.01); *H01G 4/012* (2013.01); *H01G 4/232* (2013.01)

USPC .................. 361/321.2; 361/301.2; 361/301.4; 361/306.1; 361/306.3; 361/321.1

(58) Field of Classification Search
CPC ........... H01G 4/005; H01G 4/12; H01G 4/30; H01G 4/228; H01G 4/232; H01G 4/012
USPC ................ 361/321.1, 321.2, 303–305, 301.2, 361/301.4, 306.1, 306.3, 311–313
See application file for complete search history.

(56) References Cited

U.S. PATENT DOCUMENTS

| | | | | |
|---|---|---|---|---|
| 6,982,863 B2 * | 1/2006 | Galvagni et al. | ............... | 361/309 |
| 7,345,868 B2 * | 3/2008 | Trinh | .......................... | 361/306.3 |
| 7,460,354 B2 * | 12/2008 | Shimizu et al. | ............... | 361/303 |

(Continued)

FOREIGN PATENT DOCUMENTS

| | | |
|---|---|---|
| KR | 20060068404 A | 6/2006 |
| KR | 20070002654 A | 1/2007 |

*Primary Examiner* — Nguyen T Ha
(74) *Attorney, Agent, or Firm* — McDermott Will & Emery LLP

(57) ABSTRACT

There is provided a multilayer ceramic electronic component, including: a ceramic sintered body having a plurality of dielectric layers laminated therein; first and second capacitance portions being formed on surfaces of the dielectric layers; first and second lead-out portions being respectively extended from both sides of the first and second capacitance portions to be respectively exposed through both side surfaces of the ceramic sintered body and spaced apart from each other; sealing parts enclosing both end portions and corner portions of the ceramic sintered body; and first and second external electrodes enclosing the sealing parts and formed on both end portions of the ceramic sintered body to be electrically connected to the first and second lead-out portions, respectively.

13 Claims, 7 Drawing Sheets

(56) References Cited

U.S. PATENT DOCUMENTS 8,355,240 B2 * 1/2013 Satou ................... 361/306.3
8,654,504 B2 * 2/2014 Sakuratani et al. ........ 361/306.3
8,675,341 B2 * 3/2014 Akazawa et al. .......... 361/321.1

* cited by examiner

MULTILAYER CERAMIC ELECTRONIC COMPONENT AND METHOD OF MANUFACTURING THE SAME

CROSS-REFERENCE TO RELATED APPLICATIONS

This application claims the priority of Korean Patent Application No. 10-2012-0022376 filed on Mar. 5, 2012, in the Korean Intellectual Property Office, the disclosure of which is incorporated herein by reference.

BACKGROUND OF THE INVENTION

1. Field of the Invention

The present invention relates to a multilayer ceramic electronic component and a method of manufacturing the same.

2. Description of the Related Art

As representative electronic components using a ceramic material there are provided a capacitor, an inductor, a piezoelectric element, a varistor, a thermistor and the like.

Among these ceramic electronic components, multilayer ceramic capacitors (MLCCs) have a small size, secure high capacitance, and are easily mountable.

Multilayer ceramic capacitors are chip type condensers that are mounted on circuit boards of various electronic products, such as image display devices, for example, liquid crystal displays (LCDs), plasma display panels (PDPs), and the like, computers, personal digital assistants (PDAs), cellular phones, and the like, to store and discharge electrical charges.

Heat generated in electronic devices is a growing problem, since image display devices have recently become bigger and the speed of computer central processing units (CPUs) has increased.

Therefore, multilayer ceramic capacitors are required to secure stable capacitance and reliability, even at high temperatures, for the stable operation of integrated circuits (ICs) installed in electronic devices.

The multilayer ceramic capacitor has various sizes and lamination types depending on the intended usage and capacitance thereof.

In particular, in order to meet recent requirements for electronic product such as miniaturization, lightening, and the multi-functionalization thereof, the multilayer ceramic capacitor used in the electronic products is also required to have an ultra-small size and ultra-high capacitance and to boost voltages.

For this reason, multilayer ceramic capacitors, in which dielectric layers and internal electrode layers are thin to allow for ultra-small sized products, and a large number of dielectric layers are laminated for the ultra-high capacitance thereof, have been manufactured.

In multilayer ceramic capacitors, external electrodes are formed by coating a conductive material on both end surfaces of the ceramic laminate.

Here, the external electrodes are thinner over corner portions of the laminate than in central portions thereof.

Therefore, conductive foreign substances such as plating liquid or moisture may infiltrate through the corner portions, which may cause deterioration of insulation resistance and degradation of reliability.

In particular, these phenomena are further aggravated in an ultra-high capacitance multilayer ceramic capacitor of which a cover is thin and a margin is narrow. The reason for this is that the areas of the internal electrodes overlapping each other are required to be significantly increased in order to increase product capacitance.

Patent Document 1 fails to disclose a sealing part enclosing both end portions of a laminate.

RELATED ART DOCUMENT (Patent Document 1) Korean Patent Laid-Open Publication No. 10-2007-0002654

SUMMARY OF THE INVENTION

An aspect of the present invention provides a new method of significantly reducing the infiltration of foreign substances through corner portions of a multilayer ceramic electronic component, to thereby improve reliability and significantly increase the capacitance in a limited volume.

According to an aspect of the present invention, there is provided a multilayer ceramic electronic component, including: a ceramic sintered body having a plurality of dielectric layers laminated therein; first and second internal electrodes having first and second capacitance portions and first and second lead-out portions, respectively, the first and second capacitance portions being formed on surfaces of the dielectric layers to be spaced apart from both side surfaces of the ceramic sintered body, and the first and second lead-out portions being respectively extended from both sides of the first and second capacitance portions to be respectively exposed through both side surfaces of the ceramic sintered body and spaced apart from each other in a length direction of the dielectric layers; sealing parts enclosing both end portions and corner portions of the ceramic sintered body; and first and second external electrodes enclosing the sealing parts and formed on both end portions of the ceramic sintered body to be electrically connected to the first and second lead-out portions, respectively.

A ratio of an exposed length of the first and second lead-out portions to a width of the ceramic sintered body may be 60 to 75%.

The first and second capacitance portions may each have at least one end contacting one end of the dielectric layer.

The dielectric layer may have a margin portion on which the first or second internal electrode is not formed in a corner portion thereof.

The first and second internal electrodes may be alternately formed in a vertical direction of the ceramic sintered body.

A length of a portion of each of the first and second external electrodes, which covers one side surface of the ceramic sintered body, may be greater than a length of each of the first and second lead-out portions.

The multilayer ceramic electronic component may further include cover layers formed on upper and lower surfaces of the ceramic sintered body, respectively.

According to another aspect of the present invention, there is provided a method of manufacturing a multilayer ceramic electronic component, the method including: forming first internal electrode films on surfaces of first ceramic sheets, respectively, each first internal electrode film having a first capacitance portion spaced apart from both sides of the first ceramic sheet and a first lead-out portion connected to both sides of the first ceramic sheet from both sides of the first capacitance portion; forming second internal electrode films on surfaces of second ceramic sheets, respectively, each second internal electrode film having a second capacitance portion spaced apart from both sides of the second ceramic sheet and a second lead-out portion connected to both sides of the second ceramic sheet from both sides of the second capacitance portion and the second lead-out portion being separated from the first lead-out portion; alternately laminating the first and second ceramic sheets having the first and second inner electrode films formed thereon, to form a laminate; firing the laminate; forming sealing films to enclose both end portions and corner portions of the laminate; and forming first and second external electrode films on both end portions of the laminate, the first and second external electrode films enclosing the sealing films and being electrically connected to the first and second lead-out portions exposed through both side surfaces of the ceramic sintered body.

A ratio of an exposed length of the first and second lead-out portions to a width of the ceramic sintered body may be 60 to 75%.

The method may further include forming cover layers on upper and lower surfaces of the laminate after the forming of the laminate.

In the forming of the first and second internal electrode films, at least one end of each of the first and second capacitance portions may be extended to one end of each of the first and second ceramic sheets.

In the forming of the first and second internal electrode films, the first and second ceramic sheets may have a margin portion provided in a corner portion thereof.

In the forming of the laminate, the first and second internal electrode films may be alternately formed in a vertical direction of the ceramic sintered body.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE EMBODIMENTS

Figure 1:
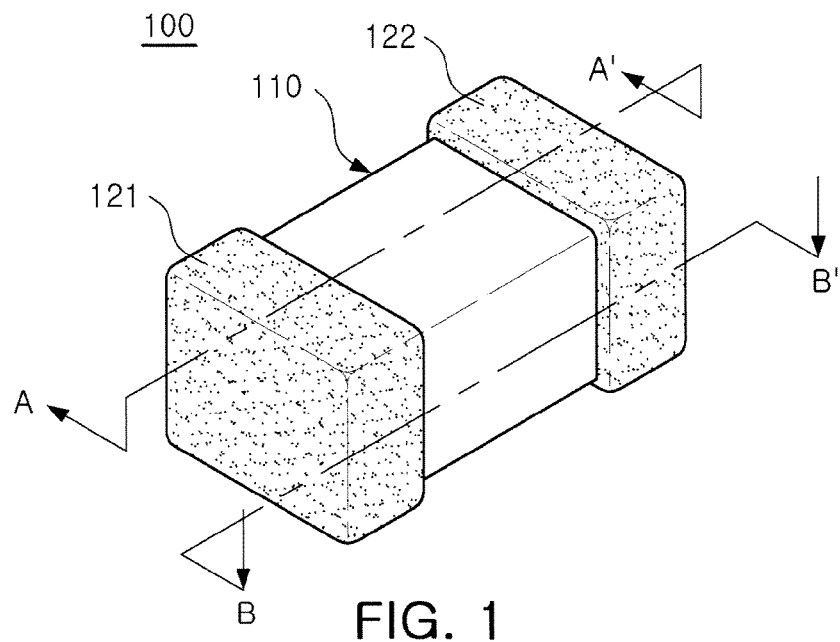
FIG. 1 is a schematic perspective view showing a structure of a multilayer ceramic capacitor according to an embodiment of the present invention.
Figure 2:
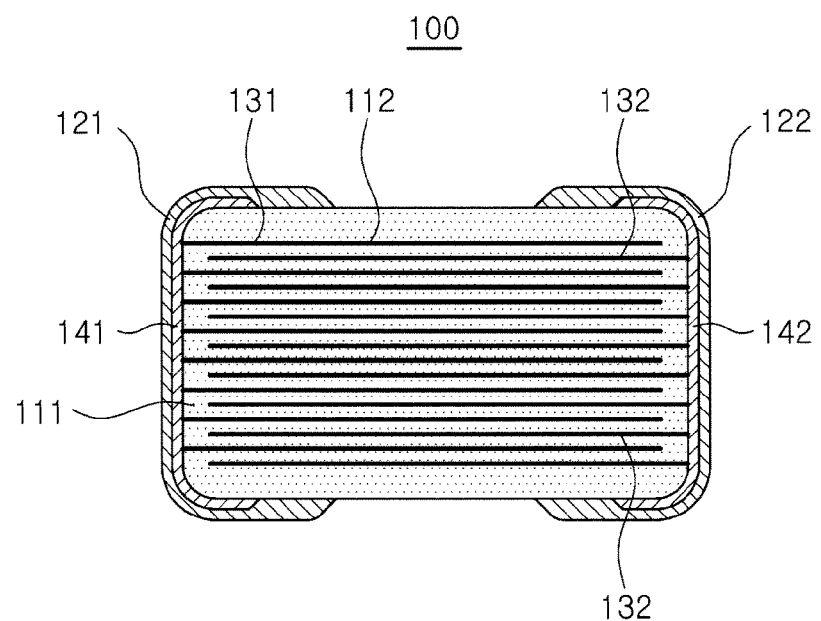
FIG. 2 is a cross-sectional view taken along line A-A' of FIG. 1.
Figure 3:
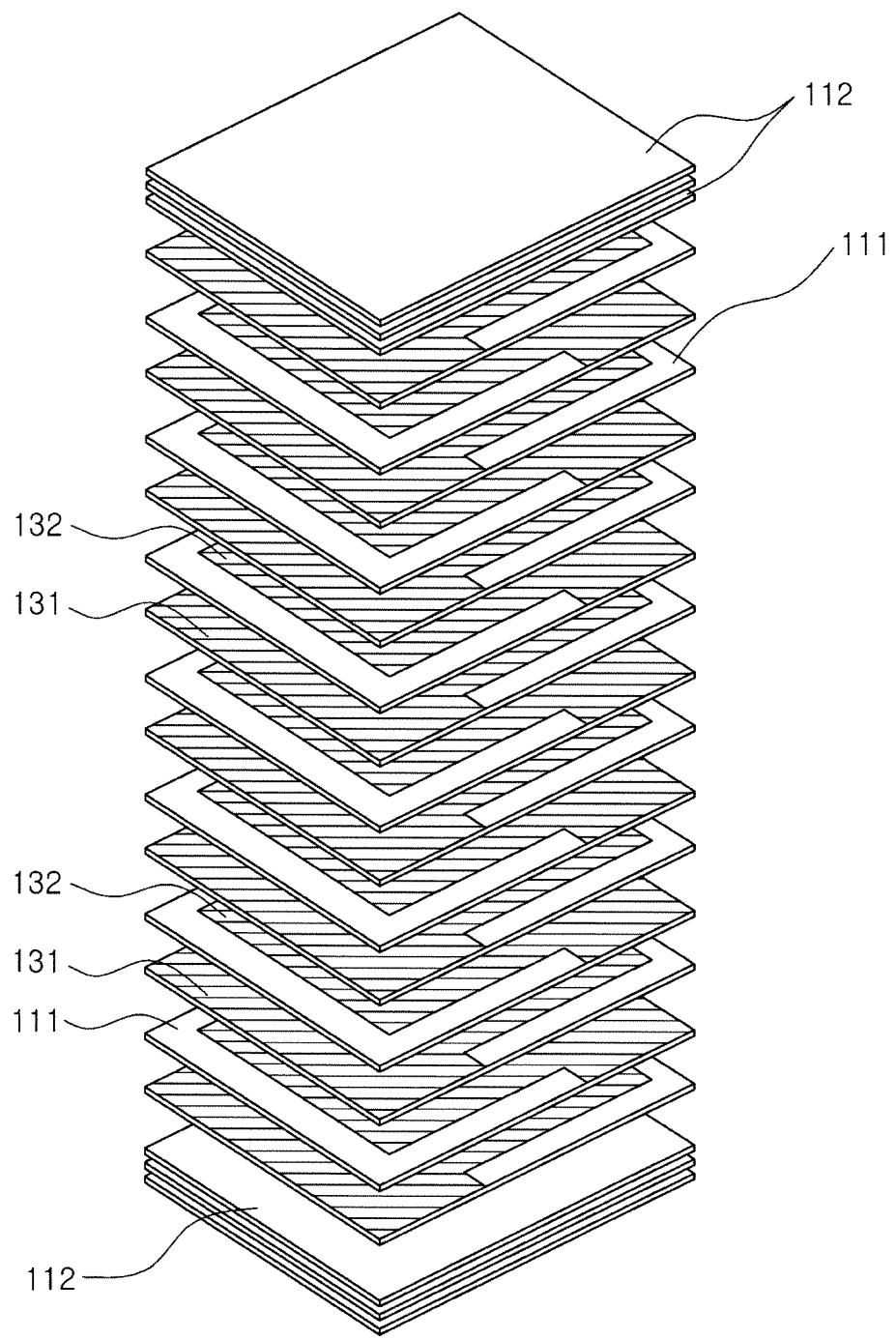
FIG. 3 is an exploded perspective view showing a lamination structure of dielectric layers, first and second internal electrodes, and cover layers of the multilayer ceramic capacitor of FIG. 1.

Hereinafter, embodiments of the present invention will be described in detail with reference to the accompanying drawings so that they can be easily practiced by those skilled in the art to which the present invention pertains.

However, the invention may be embodied in many different forms and should not be construed as being limited to the embodiments set forth herein.

The embodiments of the present invention are provided so that those skilled in the art may more completely understand the present invention.

In the drawings, the shapes and dimensions of components may be exaggerated for clarity, and the same reference numerals will be used throughout to designate the same or like components.

In addition, like reference numerals denote parts performing similar functions and actions throughout the drawings.

In addition, unless explicitly described otherwise, "comprising" any components will be understood to imply the inclusion of other components but not the exclusion of any other components.

The present invention is directed to a ceramic electronic component, the ceramic electronic component according to an embodiment of the present invention being a multilayer ceramic capacitor, an inductor, a piezoelectric element, a varistor, a chip resistor, a thermistor, or the like. The multilayer ceramic capacitor will be described as one example of the ceramic electronic component.

Referring to FIGS. 1 through 6, a multilayer ceramic capacitor 100 according to an embodiment of the present invention may include: a ceramic sintered body 110 having a plurality of dielectric layers 111 laminated therein; a plurality of first and second internal electrodes 131 and 132 formed within the ceramic sintered body 110; sealing parts 140 enclosing both end portions and corner portions of the ceramic sintered body 110; and first and second external electrodes 121 and 122 enclosing the sealing parts 140 so as not to expose the sealing parts 140 outwardly and formed at both end portions of the ceramic sintered body 110 to contact the first and second internal electrodes 131 and 132 on both side surfaces of the ceramic sintered body 110 and be electrically connected thereto.

The ceramic sintered body 110 may be formed by laminating the plurality of dielectric layers 111 including a ceramic powder.

Here, the plurality of dielectric layers 111 forming the ceramic sintered body 110 may be in a sintered state, and may be integrated in a single body such that boundaries between neighboring dielectric layers 111 may not be readily apparent.

In addition, the shape of the ceramic sintered body 110 is not particularly limited, but generally, may be formed to have a rectangular parallelepiped shape. Also, the size of the ceramic sintered body 110 is not particularly limited, but for example, may be formed to have a size of 0.6 mm×0.3 mm or the like, thereby forming a multilayer ceramic capacitor 100 having a relatively high capacitance of 1.0 μF or greater.

In addition, if necessary, dielectric cover layers 112 having a predetermined thickness may be respectively formed on upper and lower surfaces of the ceramic sintered body 110.

Two or more dielectric cover layers 112 may be laminated in a vertical direction to form a cover part having a desired thickness.

The first and second internal electrodes 131 and 132 may be formed of a conductive paste including a conductive metal, such as nickel (Ni), copper (Cu), palladium (Pd), or the like.

The first and second inner electrodes 131 and 132 may each be formed by printing an internal electrode film on a ceramic sheet for the dielectric layer 111, with the conductive paste through a printing method such as screen printing, gravure printing, or the like.

Here, the first and second internal electrodes 131 and 132 have opposing polarities. The dielectric layers 111 having the first and second internal electrodes 131 and 132 respectively formed thereon may be alternately laminated in the vertical direction, and then fired, thereby forming the ceramic sintered body 110.

Therefore, first and second lead-out portions 135 and 136 of the first and second internal electrodes 131 and 132 are alternately exposed through both side surfaces of the ceramic sintered body 110, on both left and right end portions of the ceramic sintered body 110 in the vertical direction.

Here, the thickness of the first and second internal electrodes 131 and 132 may be determined depending on intended use thereof, and for example, it may be determined to be within a range of 0.2 to 1.0 μm in consideration of the size of the ceramic sintered body 110. However, the present invention is not limited thereto.

The first and second external electrodes 121 and 122 may be formed of a conductive paste including a conductive metal, such as copper (Cu), silver (Ag), silver-palladium (Ag—Pd), copper-nickel (Cu—Ni), or the like.

Meanwhile, the dielectric layer 111 may have a margin portion having a predetermined width. The margin portion corresponds to a portion between the edges of the dielectric layer 111 and first and second capacitance portions 133 and 134, in which the conductive material of the first and second internal electrodes 131 and 132 is not formed.

The margin portion, after the forming of the ceramic sintered body 110, may prevent foreign substances from infiltrating into the first and second internal electrodes 131 and 132 and protect the first and second internal electrodes 131 and 132 from external impacts to prevent electrical short circuits.

This margin portion may be formed as small as possible in order that the multilayer ceramic capacitor 100 is ultra-miniaturized and has ultra-high capacitance.

Meanwhile, in the multilayer ceramic capacitor of the related art, when the first and second external electrodes are formed by applying a conductive material to both end portions of the ceramic sintered body, the conductive material for external electrodes may be formed to be thinner on corner portions of the end portion of the ceramic sintered body than in the centers of surfaces thereof, due to a structural feature of the ceramic sintered body.

Therefore, impurities such as conductive foreign substances, moisture, ions, and the like, may infiltrate through the corner portions of the ceramic sintered body, on which the first and second external electrodes are thinner than in the other portions, and this may cause degradation in insulating resistance and reliability of the multilayer ceramic capacitor.

In order to solve these problems, the margin portion may be provided on corner portions of each of the dielectric layers 111 when the ceramic sintered body 110 is manufactured, and thus, the infiltration of impurities through the corner portions of the ceramic sintered body 110 may be prevented. However, the first and second internal electrodes 131 and 132 have a relatively small size, which may cause a reduction in capacitance.

In particular, these phenomena may be further aggravated in an ultra-high capacitance multilayer ceramic capacitor of which the cover layer is thin and the margin portion is narrow, and the reason is that the areas of the internal electrodes that overlap each other need to be increased in order to increase product capacitance.

Accordingly, the first and second internal electrodes 131 and 132 of the present embodiment may include the first and second capacitance portions 133 and 134 and the first and second lead-out portions 135 and 136, respectively, and here, the first and second capacitance portions 133 and 134 are respectively formed on surfaces of the dielectric layers 111 and spaced apart from both side surfaces of the ceramic sintered body 110 while forming capacitance in overlapping areas thereof, and the first and second lead-out portions 135 and 136 are respectively extended from both sides of the first and second capacitance portions 133 and 134 to be respectively exposed through both side surfaces of the ceramic sintered body 110.

Here, the first and second lead-out portions 135 and 136 have different polarities. The vertically adjacent first and second lead-out portions 135 and 136 may be separated from each other in order to prevent occurrence of short circuits.

The first and second lead-out portions 135 and 136 may be disposed on the surfaces of the dielectric layers 111 to be spaced apart from each other in a length direction of the dielectric layers 111. Preferably, the first lead-out portion 135 may be formed adjacently to a left end portion of one dielectric layer 111 and the second lead-out portion 136 may be formed adjacently to a right end portion of another dielectric layer 111.

Figure 4:
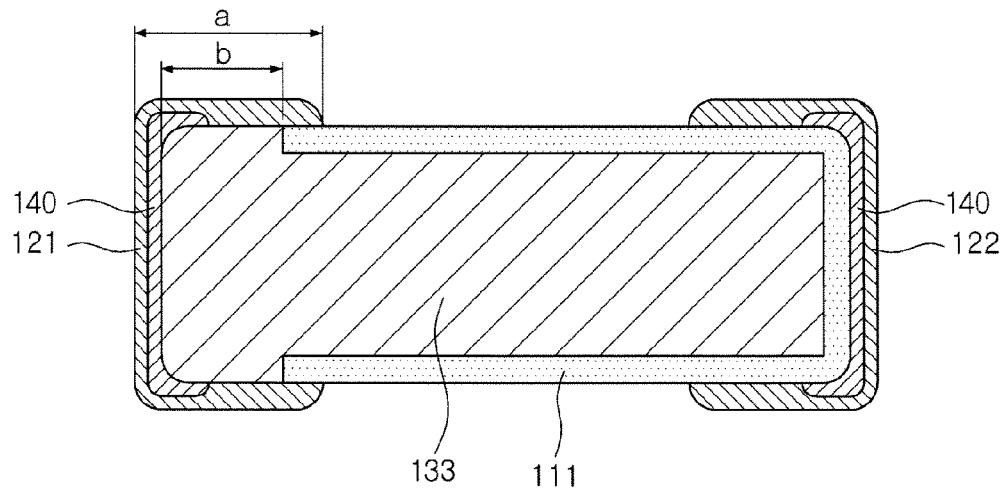
FIG. 4 is a cross-sectional view taken along line B-B' of FIG. 1.

Referring to FIG. 4, the sealing parts 140 may be formed on both side surfaces of the ceramic sintered body 110 to have a minimized length, at a level at which the infiltration of foreign substances through the corner portions of the ceramic sintered body 10 can be prevented, so that contact between the first and second lead-out portions 135 and 136 and the first and second external electrodes 121 and 122 is improved.

In addition, a length (a) of a portion of each of the first and second external electrodes 121 and 122, which covers one side surface of the ceramic sintered body 110, may be greater than a length (b) of each of the first and second lead-out portions 135 and 136, thereby preventing the first and second internal electrodes 131 and 132 from being exposed to the outside and securing contact areas between the first and second lead-out portions 135 and 136 and the first and second external electrodes 121 and 122.

Here, the first and second lead-out portions 135 and 136 may have the same length, but the present invention is not necessarily limited thereto.

For example, the exposed portions of the first lead-out portion 135 and the second lead-out portion 136 may have different lengths, or the first lead-out portion 135 and the second lead-out portion 136 may be asymmetrical to the left and to the right. As such, the first lead-out portion 135 and the second lead-out portion 136 may be formed in various manners, as necessary.

Figure 5A:
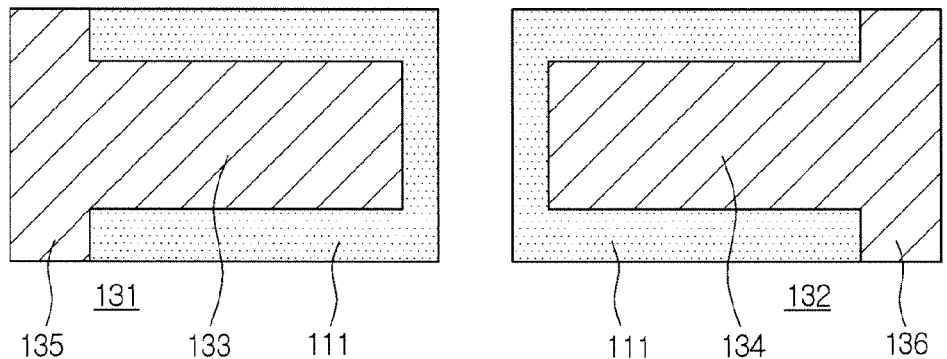
FIG. 5A is a plan view showing dielectric layers and first and second internal electrodes shown in FIG. 4.

Meanwhile, the first and second capacitance portions 133 and 134 are continuously insulated from the first and second external electrodes 121 and 122 by the sealing parts 140, respectively. Therefore, as shown in FIG. 5A, one end of each of the first and second capacitance portions 133 and 134, respectively corresponding to the first and second external electrodes 121 and 122, may be extended such that it contacts one end of the dielectric layer 111.

Figure 5B:
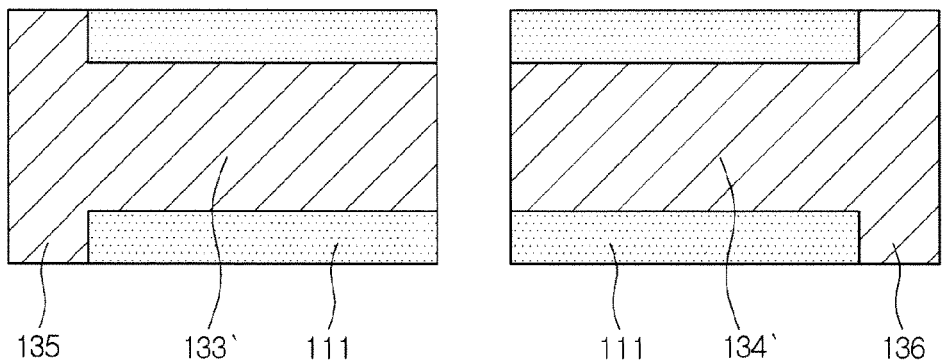
FIG. 5B is a plan view showing different shapes of the first and second internal electrodes shown in FIG. 4.
Figure 6:
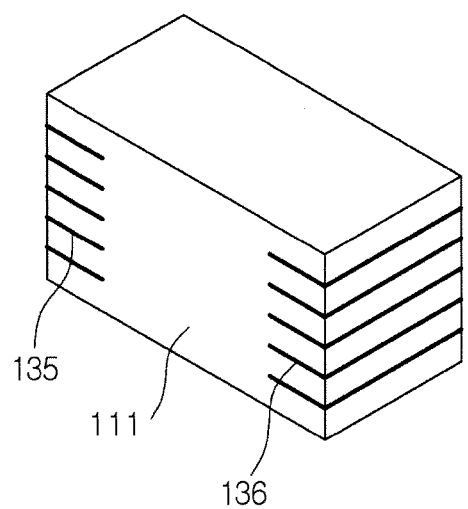
FIG. 6 is an assembled perspective view of the lamination structure shown in FIG. 3.

In addition, as for another embodiment, as shown in FIG. 5B, left and right ends of each of first and second capacitance portions 133' and 134' may be extended such that they contact both ends of the dielectric layer 111, but the present invention is not limited thereto.

Therefore, according to the above constitution, the multilayer ceramic capacitor 100 of the present embodiment can maintain product reliability, and secure high capacitance by increasing the size of the first and second capacitance portions 133 and 134 to be as large as possible.

Meanwhile, when the width of the margin portion with respect to the width of the corner portion of the ceramic sintered body 110 is increased, the influence of step height on the corner portion is increased, and material movement to a step height portion is insufficient during compression of the dielectric layers 111, resulting in a reduction in the density thereof, which may cause cracks. In the present embodiment, these problems may be solved by significantly decreasing the width of the margin portion with respect to the width of the corner portion.

Table 1 below shows a ratio of the exposed length of the first and second lead-out portions to the width of the ceramic sintered body in the embodiment of the present invention.

be significantly reduced to secure reliability, and overlapping areas of the internal electrodes may be significantly increased to secure high capacitance.

Figure 7:
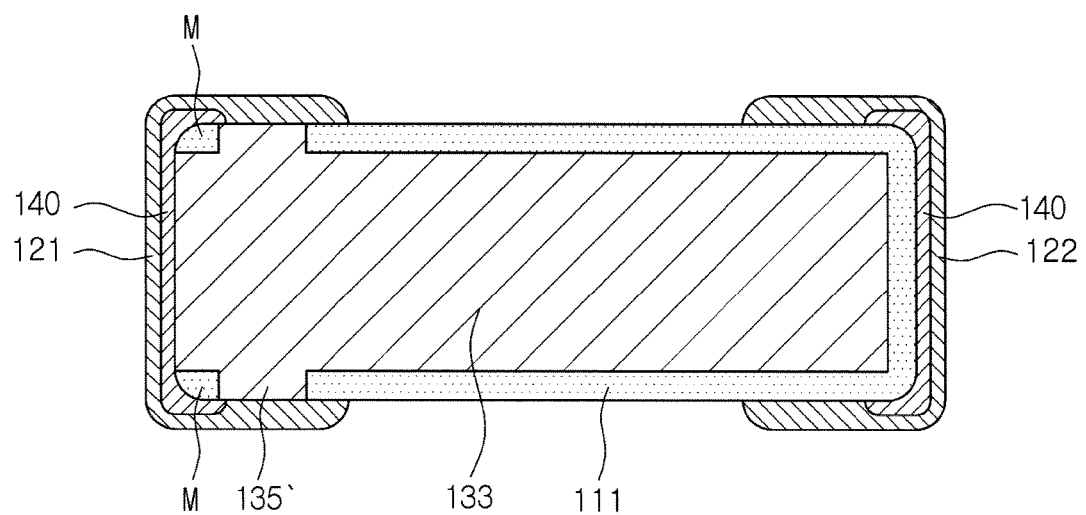
FIG. 7 is a cross-sectional view taken along line B-B' of a multilayer ceramic capacitor according to another embodiment of the present invention.
Figure 8A:
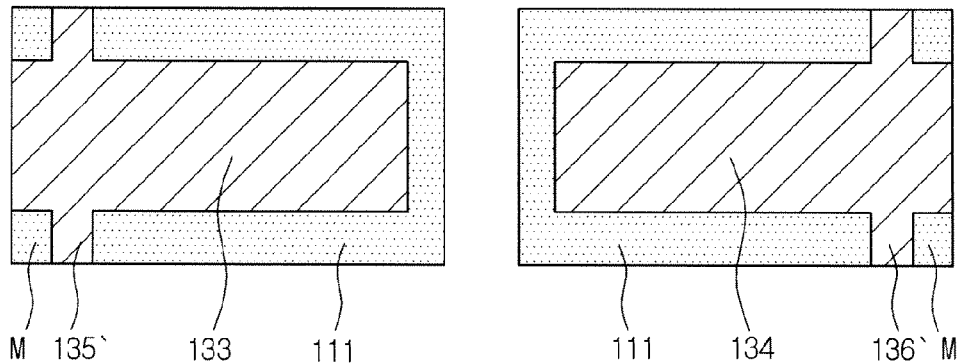
FIG. 8A is a plan view of dielectric layers and first and second internal electrodes shown in FIG. 7.
Figure 8B:
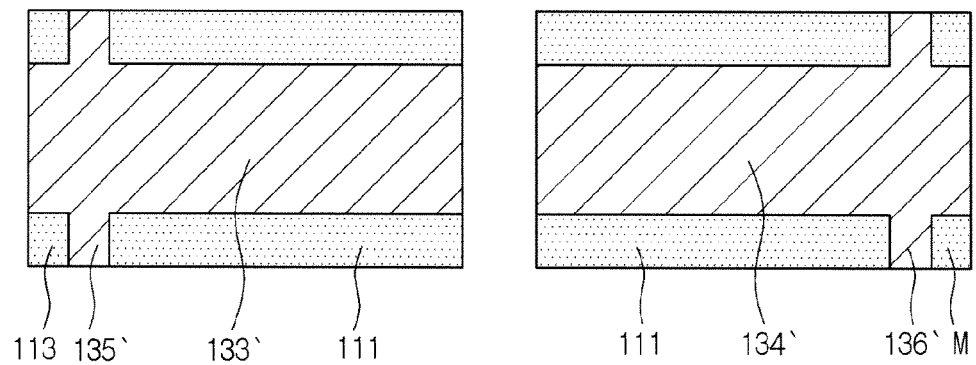
FIG. 8B is a plan view showing different shapes of the first and second internal electrodes shown in FIG. 7.
Figure 9:
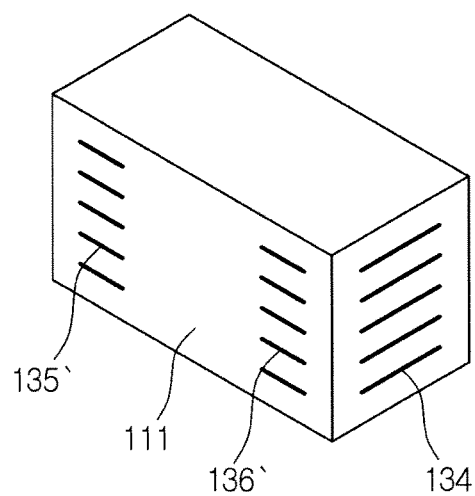
FIG. 9 is an assembled perspective view showing dielectric layers, first and second internal electrodes, and cover layers of the multilayer ceramic capacitor having the structure of FIG. 7.

FIGS. 7 through 9 show a multilayer ceramic capacitor according to another embodiment of the present invention. The multilayer ceramic capacitor according to this embodiment has a structure for securing significantly increased capacitance of product while significantly increasing the effect of preventing the infiltration of impurities through corner portions of the ceramic sintered body 110.

Referring to FIGS. 7, 8A, and 9, the first and second internal electrodes of the present embodiment, similar to the first and second internal electrodes shown in FIG. 5A, may include the first and second capacitance portions 133 and 134, each having one end extended to one end of the dielectric layer 111, and the first and second lead-out portions 135' and 136' respectively exposed through both sides of the dielectric layers 111. The present embodiment is different from the above-described embodiment in that margin portions (M) are formed on corner portions of the dielectric layer 111, on which the first and second external electrodes 121 and 122 are formed.

Hereinafter, detailed descriptions of the same features as those of the above-described embodiment will be omitted.

Referring to FIG. 8B, the first and second internal electrodes of the present embodiment, similar to the first and second internal electrodes shown in FIG. 5B, may include the first and second capacitance portions 133' and 134', each having both left and right ends extended to both ends of the

TABLE 1

| MLCC SIZE | W SIZE | DESIGN MARGIN RATIO | ROUND WEAR RATE | SEAL MARGIN RATIO | MINIMUM EW-W RATIO | NUMBER OF LAYERS | EW-W RATIO | CAPACITANCE PERCENTAGE | FREQUENCY OF CONTACT OCCURRENCE |
|---|---|---|---|---|---|---|---|---|---|
| 1005 | 500 μm | 25% | 5% | 24% | 70% | 200 L | 64% | 99.30% | 514 PPM |
|  |  |  |  |  |  |  | 70% | 99.50% | 30 PPM |
|  |  |  |  |  |  |  | 80% | 99.80% | 10 PPM |
|  |  |  |  |  |  |  | 90% | 99.90% | 9 PPM |
| 1608 | 800 μm | 23% | 10% | 20% | 75% | 250 L | 70% | 99.50% | 217 PPM |
|  |  |  |  |  |  |  | 75% | 99.80% | 25 PPM |
|  |  |  |  |  |  |  | 80% | 100.3% | 10 PPM |
|  |  |  |  |  |  |  | 85% | 101.3% | 8 PPM |
| 2012 | 1200 μm | 15% | 12% | 13% | 65% | 300 L | 60% | 99.20% | 81 PPM |
|  |  |  |  |  |  |  | 65% | 99.60% | 20 PPM |
|  |  |  |  |  |  |  | 80% | 99.60% | 15 PPM |
|  |  |  |  |  |  |  | 85% | 99.40% | 6 PPM |
| 3216 | 1600 μm | 13% | 21% | 10% | 60% | 350 L | 50% | 99.80% | 52 PPM |
|  |  |  |  |  |  |  | 60% | 99.70% | 9 PPM |
|  |  |  |  |  |  |  | 80% | 99.80% | 4 PPM |
|  |  |  |  |  |  |  | 85% | 99.90% | 5 PPM |

<Ratio of exposed length of first and second lead-out portions to width of ceramic sintered body>

Referring to Table 1, it may be confirmed that, when the ratio of the exposed length of the first and second lead-out portions 135 and 136 to the width of the ceramic sintered body 110 is appropriately secured, the frequency of contact occurrence is rapidly reduced.

For example, it may be seen that the minimum ratio of the exposed length of the first and second lead-out portions 135 and 136 to the width of the ceramic sintered body 110 is 70% for a 1005-sized chip, 75% for a 1068-sized chip, 65% for a 2012-sized chip, and 60% for a 3216-sized chip.

Accordingly, it may be seen that, when the ratio of the exposed length of the first and second lead-out portions 135 and 136 to the width of the ceramic sintered body 110 for securing a predetermined level of the frequency of contact occurrence is within 60 to 75%, the occurrence of cracks due to defective contact and the infiltration of plating liquid may dielectric layer 111 and the first and second lead-out portions 135' and 136' respectively exposed through both sides of the dielectric layers 111. The present embodiment is different from the above-described embodiment in that margin portions (M) are formed on corner portions of the dielectric layer 111, on which the first and second external electrodes 121 and 122 are formed.

Hereinafter, detailed descriptions of the same features as those of the above-described embodiment will be omitted.

FIGS. 10 through 13 show first and second internal electrodes according to another embodiment of the present invention.

Figure 10:
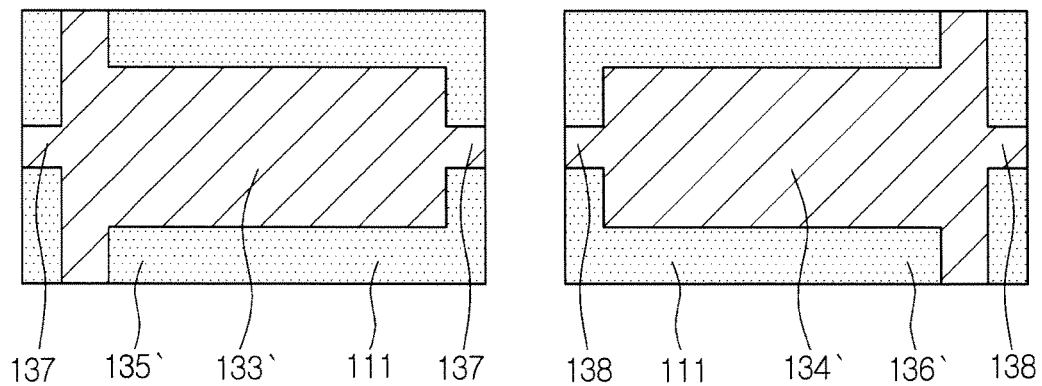
FIG. 10 is a plan view showing dielectric layers and first and second internal electrodes of a multilayer ceramic capacitor according to another embodiment of the present invention.
Figure 11:
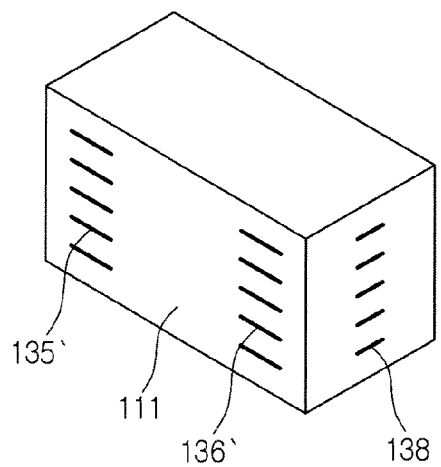
FIG. 11 is an assembled perspective view showing dielectric layers, first and second internal electrodes, and cover layers of the multilayer ceramic capacitor having the structure of FIG. 10.

Referring to FIGS. 10 and 11, the first and second internal electrodes of the present embodiment, similar to the first and second internal electrodes shown in FIG. 8B, may include the first and second capacitance portions 133' and 134', each having one end extended to both ends of the dielectric layer 111 and the first and second lead-out portions 135' and 136' respectively exposed through both sides of the dielectric layers 111. The margin portions (M) are formed on corner portions of the dielectric layer 111, on which the first and second external electrodes 121 and 122 are formed.

Here, the present embodiment is different from the above-described embodiment in that extension portions 137 and 138 respectively extending to left and right ends of the dielectric layer 111 have a significantly reduced area in order to significantly increase the effect of preventing the infiltration of impurities through the left and right corner portions of the dielectric layer 111.

Hereinafter, detailed descriptions of the same features as those of the above-described embodiment will be omitted.

Figure 12:
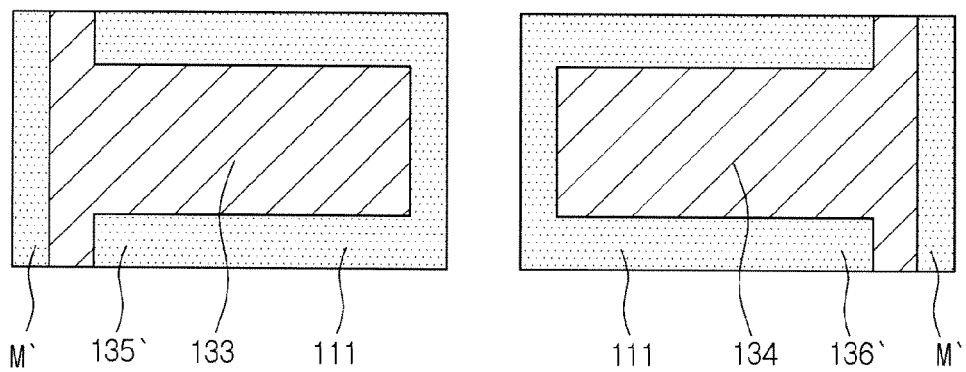
FIG. 12 is a plan view showing dielectric layers and first and second internal electrodes of a multilayer ceramic capacitor according to another embodiment of the present invention.
Figure 13:
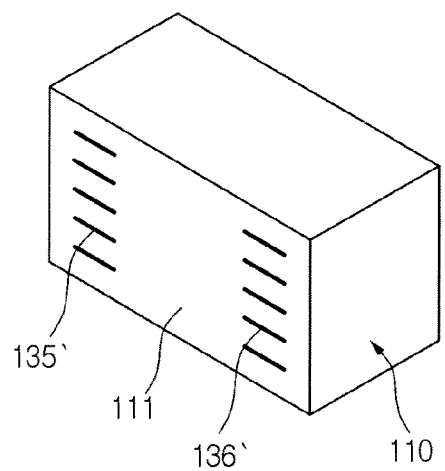
FIG. 13 is an assembled perspective view showing dielectric layers, first and second internal electrodes, and cover layers of the multilayer ceramic capacitor having the structure of FIG. 12.

Referring to FIGS. 12 and 13, the first and second internal electrodes of the present embodiment, similar to the first and second internal electrodes shown in FIG. 5A, may include the first and second capacitance portions 133 and 134, each having one end extended to one end of the dielectric layer 111, and the first and second lead-out portions 135' and 136' exposed through both sides of the dielectric layers 110.

Here, portions of the first and second capacitance portions 133 and 134, on which the first and second external electrodes 121 and 122 are formed, are omitted to significantly increase areas of the margin portions (M') of the dielectric layer 111.

Hereinafter, detailed descriptions of the same features as those of the above-described embodiment will be omitted.

Hereinafter, a method of manufacturing a multilayer ceramic capacitor according to an embodiment of the present invention will be described.

A plurality of first and second ceramic sheets are prepared.

The first and second ceramic sheets are prepared for forming dielectric layers 111 of a ceramic sintered body 110. The ceramic sheets may be formed by preparing a slurry through mixture of a ceramic powder, a polymer, and a solvent and molding the slurry into sheets having a thickness of several μm through a doctor blade method or the like.

Then, first and second inner electrode films are formed by respectively printing a conductive paste on at least one surface of the first and second ceramic sheets in a predetermined thickness of, for example, 0.2 to 1.0 μm.

The conductive paste may be printed on the first and second ceramic sheets such that first and second capacitance portions 133 and 134 have margin portions having a predetermined width along both sides of the first and second ceramic sheets and first and second lead-out portions 135 and 136 are extended from both sides of the first and second capacitance portions 133 and 134 to both sides of the first and second ceramic sheets.

As the printing method of the conductive paste, screen printing, gravure printing, or the like may be used. The conductive paste may include a metal powder, a ceramic powder, a silica ($SiO_2$) powder, and the like, but the present invention is not limited thereto.

Then, the plurality of first and second ceramic sheets are alternately laminated, thereby forming a laminate.

Here, the overall thickness of the laminate may be controlled by regulating the number of first and second ceramic sheets.

In addition, at least one dielectric cover layer 112 may be further laminated on an upper or lower surface of the laminate.

The dielectric cover layer 112 may have the same composition as that of the dielectric layer 111. However, the dielectric cover layer 112 is different from the dielectric layer 111 in that it does not include an inner electrode thereon.

Then, the laminate is cut into chips by cutting each region of the laminate corresponding to one capacitor, and then the chips are fired at a high temperature, thereby completing manufacturing of the ceramic sintered body 110.

Sealing films are then formed on both side surfaces of the ceramic sintered body 110 to enclose both end portions and corner portions of the ceramic sintered body 110.

First and second external electrodes 121 and 122 are then prepared by forming first and second external electrode films to contact the first and second lead-out portions 135 and 136 exposed through both side surfaces of the ceramic sintered body 110 and be electrically connected thereto while enclosing the sealing films.

Here, as necessary, surfaces of the first and second external electrodes 121 and 122 may be subjected to a plating process using nickel, tin, or the like.

As set forth above, according to embodiments of the present invention, sealing parts are formed to enclose both end portions and corner portions of the ceramic sintered body, thereby significantly reducing the infiltration of moisture, ions, conductive foreign substances, and the like, through the corner portions of the multilayer ceramic electronic component, and thus, reliability can be improved. Further, the internal electrodes may be formed to have a large area, capacitance of the product can be significantly increased in a limited volume thereof.

While the present invention has been shown and described in connection with the embodiments, it will be apparent to those skilled in the art that modifications and variations can be made without departing from the spirit and scope of the invention as defined by the appended claims.

What is claimed is:

1. A multilayer ceramic electronic component, comprising:
    a ceramic sintered body having a plurality of dielectric layers laminated therein;
    first and second internal electrodes having first and second capacitance portions and first and second lead-out portions, respectively, the first and second capacitance portions being formed on surfaces of the dielectric layers to be spaced apart from both side surfaces of the ceramic sintered body, and the first and second lead-out portions being respectively extended from both sides of the first and second capacitance portions to be respectively exposed through both side surfaces of the ceramic sintered body and spaced apart from each other in a length direction of the dielectric layers;
    sealing parts enclosing both end portions and corner portions of the ceramic sintered body; and
    first and second external electrodes enclosing the sealing parts and formed on both end portions of the ceramic sintered body to be electrically connected to the first and second lead-out portions, respectively.

2. The multilayer ceramic electronic component of claim 1, wherein a ratio of an exposed length of the first and second lead-out portions to a width of the ceramic sintered body is 60 to 75%.

3. The multilayer ceramic electronic component of claim 1, wherein the first and second capacitance portions each have at least one end contacting one end of the dielectric layer.

4. The multilayer ceramic electronic component of claim 3, wherein the dielectric layer has a margin portion on which the first or second internal electrode is not formed in a corner portion thereof.

5. The multilayer ceramic electronic component of claim 1, wherein the first and second internal electrodes are alternately formed in a vertical direction of the ceramic sintered body.

6. The multilayer ceramic electronic component of claim 1, wherein a length of a portion of each of the first and second external electrodes, which covers one side surface of the ceramic sintered body, is greater than a length of each of the first and second lead-out portions.

7. The multilayer ceramic electronic component of claim 1, further comprising cover layers formed on upper and lower surfaces of the ceramic sintered body, respectively.

8. A method of manufacturing a multilayer ceramic electronic component, the method comprising:

- forming first internal electrode films on surfaces of first ceramic sheets, respectively, each first internal electrode film having a first capacitance portion spaced apart from both sides of the first ceramic sheet and a first lead-out portion connected to both sides of the first ceramic sheet from both sides of the first capacitance portion;
- forming second internal electrode films on surfaces of second ceramic sheets, respectively, each second internal electrode film having a second capacitance portion spaced apart from both sides of the second ceramic sheet and a second lead-out portion connected to both sides of the second ceramic sheet from both sides of the second capacitance portion and the second lead-out portion being separated from the first lead-out portion;
- alternately laminating the first and second ceramic sheets having the first and second inner electrode films formed thereon, to form a laminate;
- firing the laminate;
- forming sealing films to enclose both end portions and corner portions of the laminate; and
- forming first and second external electrode films on both end portions of the laminate, the first and second external electrode films enclosing the sealing films and being electrically connected to the first and second lead-out portions exposed through both side surfaces of the ceramic sintered body.

9. The method of claim 8, wherein a ratio of an exposed length of the first and second lead-out portions to a width of the ceramic sintered body is 60 to 75%.

10. The method of claim 8, further comprising forming cover layers on upper and lower surfaces of the laminate after the forming of the laminate.

11. The method of claim 8, wherein, in the forming of the first and second internal electrode films, at least one end of each of the first and second capacitance portions is extended to one end of each of the first and second ceramic sheets.

12. The method of claim 8, wherein, in the forming of the first and second internal electrode films, the first and second ceramic sheets have a margin portion provided in a corner portion thereof.

13. The method of claim 8, wherein, in the forming of the laminate, the first and second internal electrode films are alternately formed in a vertical direction of the ceramic sintered body.

* * * * *